US008959500B2

United States Patent
Van De Waerdt et al.

(10) Patent No.: US 8,959,500 B2
(45) Date of Patent: Feb. 17, 2015

(54) PIPELINED PROCESSOR AND COMPILER/SCHEDULER FOR VARIABLE NUMBER BRANCH DELAY SLOTS

(75) Inventors: Jan-Willem Van De Waerdt, San Jose, CA (US); Steven Roos, Eindhoven (NL)

(73) Assignee: Nytell Software LLC, Wilmington, DE (US)

( * ) Notice: Subject to any disclaimer, the term of this patent is extended or adjusted under 35 U.S.C. 154(b) by 1127 days.

(21) Appl. No.: 12/518,485

(22) PCT Filed: Dec. 11, 2007

(86) PCT No.: PCT/IB2007/055014
§ 371 (c)(1),
(2), (4) Date: Jun. 10, 2009

(87) PCT Pub. No.: WO2008/072178
PCT Pub. Date: Jun. 19, 2008

(65) Prior Publication Data

US 2010/0050164 A1 Feb. 25, 2010

Related U.S. Application Data

(60) Provisional application No. 60/874,530, filed on Dec. 11, 2006.

(51) Int. Cl.
*G06F 9/45* (2006.01)
*G06F 9/30* (2006.01)
*G06F 9/38* (2006.01)

(52) U.S. Cl.
CPC .............. *G06F 8/45* (2013.01); *G06F 9/30061* (2013.01); *G06F 8/443* (2013.01); *G06F 9/3842* (2013.01)
USPC .......................................... 717/151; 712/234

(58) Field of Classification Search
CPC . G06F 9/30061; G06F 9/3806; G06F 9/3844; G06F 9/3848; G06F 8/443
USPC .............................. 717/101–178; 712/1–248, 712/E9.001–E9.086; 711/147, 213, 215; 713/502; 718/102
See application file for complete search history.

(56) References Cited

U.S. PATENT DOCUMENTS 5,386,562 A * 1/1995 Jain et al. ........................ 717/160
5,394,530 A * 2/1995 Kitta ............................. 712/240

(Continued)

FOREIGN PATENT DOCUMENTS

| EP | 1 369 776 A | 12/2003 |
| JP | 04 191931 A | 7/1992 |
| JP | 90 050374 A | 2/1997 |

OTHER PUBLICATIONS

Exploiting Fine-Grain Thread Level Parallelism on the MIT Multi-ALU Processor Stephen W. Keckler, William J. Daily, Daniel Maskit, Nicholas P. Carter, Andrew Chang, Whay S. Leey Computer Systems Laboratory yArtificial Intelligence Laboratory Stanford University Massachusetts Institute of Technology—Jun. 27-Jul. 2, 1998.*

(Continued)

*Primary Examiner* — Lewis A Bullock, Jr.
*Assistant Examiner* — Francisco Aponte
(74) *Attorney, Agent, or Firm* — McAndrews, Held & Malloy, Ltd.

(57) ABSTRACT

Different numbers of delay slots are assigned by a compiler/scheduler to each different type of jump operation in a pipelined processor system. The number of delay slots is variable and kept to the minimum needed by each type of jump operation. A compatible processor uses a corresponding number of branch delay slots to exploit the difference in predictability of different types of branch or jump operations. Different types of jump operations resolved their target addresses in different numbers of delay slots. As a result, the compiler/scheduler is able to generate more efficient code than for a processor with a fixed number of delay slots for all jump types, resulting in better processor performance.

21 Claims, 4 Drawing Sheets

(56) References Cited

U.S. PATENT DOCUMENTS

| | | | | |
|---|---|---|---|---|
| 5,574,939 | A * | 11/1996 | Keckler et al. | 712/24 |
| 5,715,440 | A * | 2/1998 | Ohmura et al. | 712/233 |
| 5,758,162 | A * | 5/1998 | Takayama et al. | 717/151 |
| 5,809,294 | A * | 9/1998 | Ando | 712/233 |
| 5,867,683 | A * | 2/1999 | Witt et al. | 712/218 |
| 5,887,174 | A * | 3/1999 | Simons et al. | 717/161 |
| 6,044,222 | A * | 3/2000 | Simons et al. | 717/156 |
| 6,178,499 | B1 * | 1/2001 | Stotzer et al. | 712/241 |
| 6,389,531 | B1 * | 5/2002 | Irle et al. | 712/237 |
| 6,446,258 | B1 * | 9/2002 | McKinsey et al. | 717/161 |
| 6,487,715 | B1 * | 11/2002 | Chamdani et al. | 717/154 |
| 6,560,775 | B1 * | 5/2003 | Artymov et al. | 717/151 |
| 6,772,325 | B1 * | 8/2004 | Irie et al. | 712/238 |
| 6,799,315 | B2 * | 9/2004 | Waki et al. | 717/148 |
| 6,859,874 | B2 * | 2/2005 | Kruckemyer | 712/233 |
| 7,043,416 | B1 * | 5/2006 | Lin | 703/17 |
| 7,266,676 | B2 * | 9/2007 | Tran et al. | 712/238 |
| 7,447,886 | B2 * | 11/2008 | Lee et al. | 712/241 |
| 2002/0002670 | A1 * | 1/2002 | Yoshida et al. | 712/245 |
| 2002/0066006 | A1 * | 5/2002 | Worrell | 712/237 |
| 2003/0070062 | A1 * | 4/2003 | Krishnan et al. | 712/234 |
| 2005/0015577 | A1 * | 1/2005 | Kruckemyer | 712/239 |
| 2005/0125786 | A1 * | 6/2005 | Dai et al. | 717/161 |
| 2005/0132176 | A1 * | 6/2005 | Kruckemyer | 712/239 |
| 2006/0095895 | A1 * | 5/2006 | K. | 717/130 |

OTHER PUBLICATIONS

Gross, T.R., et al; "Optimizing Delayed Branches"; Proceedings Annual Microprogramming Workshop, Oct. 5, 1982; p. 114-120; XP008042573.

Gonzalez, A.M.; "A Survey of Branch Techniques in Pipelined Processors"; Microprocessing and Microprogramming, Elsevier Science Publishers, BV; Amsterdam, NL; vol. 36, No. 5; Oct. 1, 1993; pp. 243-257; XP000397907; ISSN: 0165-6074.

Terechko, A.S., et al; "PRMDL: A Machine Description Language for Clustered VLIW Architecture"; 2001; IEEE Comput. Soc; p. 821.

* cited by examiner

PIPELINED PROCESSOR AND COMPILER/SCHEDULER FOR VARIABLE NUMBER BRANCH DELAY SLOTS

This invention relates to computer processor systems, and more particularly to exploiting the differences in execution sequence predictability that exist for various kinds of branch instructions in pipelined processors.

In pipelined computer architectures, a branch delay instruction is a program instruction that immediately follows a conditional branch instruction and can be executed regardless of the outcome of the branch condition. The location of such an instruction in the pipeline is called a branch delay slot. Branch delay slots are used to improve performance, such as in MIPS, PA-RISC and SPARC types of RISC architectures, and in the µPD77230 and TMS320C3x types of DSP architectures.

A pipelined processor architecture will provide its optimum performance if the pipeline is kept full of useful instructions at all times. But the program flow is not always straight-line, and so the next instruction in sequence may not necessarily be the next one to execute because of conditional branches and jumps. Branch delay slots are a side-effect of the pipelined architectures, and conditional branches can not be resolved until the instruction has worked its way through the fetch, decode, and execute stages of the pipeline.

A simple, but wasteful way to deal with the uncertainties of conditional branches and jumps is to insert and execute no-operation (NOP) instructions after every conditional branch instruction until a new branch target address can be computed and loaded into the program counter. Each such branch delay slot fills one instruction cycle period.

More sophisticated designs try to execute useful program instructions in the branch delay slots which are independent of the branch instruction. Such optimization can be instilled by the compiler/scheduler at compile time. During execute time, the number of them that get executed is fixed. If the hardware supports it, the instructions are placed into the instruction stream branch delay slots. However, special handling is needed to correctly manage instruction breakpoints and debug stepping within branch delay slots.

The number of branch delay slots to be filled is dictated by the number of pipeline stages in each particular implementation, any register forwarding, the stage the branch conditions are computed in the pipeline, whether a branch target buffer (BTB) is used, etc. The performance penalties caused by conditional branch instructions and jumps has been alleviated somewhat in the prior art by using branch prediction techniques and speculative execution.

So branch or jump delay slots are conventional techniques used to keep a processor's pipeline full of operations all the time. The outcome of a jump operation may only be known in the execute pipeline stage (EX), and the outcome is required in the instruction fetch pipeline stage (IF). Consider the following code in Table-I.

TABLE I

MUL r1 r8 –> r7
AND r4 r5 –> r9
SUB r11 r15 –> r2
SLL r23 r21 –> r24
ADD r2 r23 –> r6
JMP r6 <immediate target address>
<fall thru path>
OPA1
OPA2
<target address>

TABLE I-continued

OPB1
OPB2

The jump operation (JMP) here is a "conditional jump with immediate target" type. The condition being satisfied is determined during execute time by the contents of the memory address pointed to in register r6. If zero, the jump is taken, otherwise it is not taken. So at compile time, the compiler/scheduler cannot know what branch will be taken in the future. The target address is encoded as an immediate value as part of the operation word, as fetched in the IF stage, and represents the jump operation "JMP r6<immediate target address>".

In a multi-stage processor pipeline, a complication arises in which operation should be fetched after a jump operation has been fetched, decoded, and executed. It could be the first operation of the fall thru path, or the first operation at the target address. The answer will only be known when the jump operation makes it most of the way down the pipeline and is actually executed in the pipeline's execute stage and the condition is evaluated.

There are different types of jump operations besides the conditional jump with immediate target type just discussed. Table-II lists a few others, and FIG. 1 diagrams them in a tree structure.

TABLE II

| JMP <immediate target address> | unconditional jump with immediate target type does not have a condition, and will always jump. |
| --- | --- |
| JMP r6 r7 | conditional jump with register based target type uses a register value as target address. The target is not encoded as part of the operation word. |
| JMP r7 | unconditional jump with register based target type does not have a condition, and will always jump to the register value. |

Predictions can be made as to what operation to fetch after a jump operation. Rather than waiting for the condition of the jump operation to be evaluated, its outcome can often be predicted and used to direct the instruction fetch (IF) pipeline stage. A conditional jump with register based target type requires that the branch target be predicted, it is not encoded as part of the operation word. If a prediction is wrong, repair logic is required to recover from every mis-prediction.

Such prediction logic can add significant hardware area and complexity to the processor design.

Branch/jump delay slots have been used in processor designs to allow the IF stage to fetch operations placed just after a jump operation for execution independent of a conditional jump. The compiler/scheduler has to re-organize the code to put such instructions in the branch/jump delay slots. Such operations can safely be executed, as they are independent of the outcome of the jump operation. Useful work is done during the period of target address uncertainty. The character of the processor pipeline has to be known to the compiler/scheduler. In a 3-stage pipeline, a jump in the EX stage cannot affect the fetching of the current operation, but only the fetching of a next operation after that.

In Table-III, the shift-left-logical (SLL) operation has been moved into the JMP operation's delay slot, assuming one delay slot. Its execution is independent of the JMP because r23, r21, and r24 are not affected or effect what's going on with r6. The code sequence of Table-III, re-organized by the compiler/scheduler, is the functional equivalent of the original code sequence of Table-I.

TABLE III

```
MUL r1 r8 -> r7
AND r4 r5 -> r9
SUB r11 r15 -> r2
ADD r2 r23 -> r6
JMP r6 <immediate target address>
SLL r23 r21 -> r24
<fall thru path>
OPA1
OPA2
<target address>
OPB1
OPB2
```

Over the years, the number of processor pipeline stages being introduced in new products has steadily increased. Such has been accompanied by higher clock frequencies. The prediction schemes too are getting more complex, in order to improve prediction accuracy. But as a consequence, each miss-prediction becomes more expensive. The number of jump delay slots has to be increased to account for the pipeline distance between where in the execute stage (EX) the outcome of the JMP will be known, and where in the instruction fetch stage (IF) the result has to land. In an 8-stage pipeline, such as in FIG. 2, a JMP outcome will become known in the EX1 stage. So, five jump delay slots are needed to keep the pipeline filled with useful operations.

If an exemplary 8-stage pipeline requires five jump/branch delay slots, the compiler/scheduler for it needs to find five operations that are independent of the jump outcome so they can be moved to the JMP operation's delay slots. Such is not always possible. Consider the original code sequence in Table-IV.

TABLE IV

```
MUL r1 r8 -> r7
AND r4 r5 -> r9
SUB r11 r15 -> r2
SLL r23 r21 -> r24
ADD r2 r23 -> r6
JMP r6 <immediate target address>
(5 delay slots)
```

Here, there are five operations that precede the JMP. But the ADD calculates the jump condition in r6 from r2 and r23. So the ADD depends on the outcome of the SUB, e.g., r2 is the result calculated by SUB. The SUB and ADD operations are not candidates that can be repositioned after the JMP. This leaves only the MUL, AND and SLL operations as viable options for relocation into the delay slots following JMP. So only three of the five operations listed here can be used to fill less than all of delay slots with useful operations. If no more can be found, two of the delay slots will have to be filled with useless NOP's. E.g., as in Table-V.

TABLE V

```
SUB r11 r15 -> r2
ADD r2 r23 -> r6
JMP r6 <immediate target address>
MUL r1 r8 -> r7
AND r4 r5 -> r9
SLL r23 r21 -> r24
NOP
NOP
```

A shortage of operations that are independent of the JMP operation necessitates the inclusion by the compiler of useless NOP operations and increases the size of the assembler and machine code. Such is current practice in the state-of-the-art. For example, statically scheduled processors like the Texas InstrumentsTMS320C6x and the NXP/Philips Semiconductors TriMedia processors use a fixed number of delay slots for each jump operation.

In an example embodiment, a compiler/scheduler for a pipelined processor sorts out all the jump/branch instructions into types, such as conditional immediate, conditional register-based, non-conditional immediate, and non-conditional register-based. It assumes that the target addresses for each type will be resolved during run time at different stages in the instruction fetch, instruction decode, register file, and instruction execute stages. Different numbers of branch delay slots are assigned to each jump/branch instruction according to how soon the target address can be resolved. The compiler/scheduler then fills these branch delay slots with as many useful instructions as are available, and that can be executed without regard to the branch taken in the associated jump. The hardware construction of the pipelined processor is such that the reloading of the pipeline during a branch fits the respective number of delay slots known by the compiler/scheduler.

An advantage of the present invention is significant processor performance improvements can be achieved by the compiler/scheduler.

Another advantage of the present invention is a pipelined processor invention is provided in which infringement can be readily detected.

A still further advantage of the present invention is a compiler/scheduler is provided that can accommodate any kind or size of pipelined computer architecture.

The above summary of the present invention is not intended to represent each disclosed embodiment, or every aspect, of the present invention. Other aspects and example embodiments are provided in the figures and the detailed description that follows.

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

Processor embodiments of the present invention assign different numbers of delay slots to each different type of jump operation. Since the number of delay slots is kept to the minimum needed by each type of jump operation, the compiler/scheduler need not insert as many useless NOP's as would otherwise be the case. Such thereby effectively improves processor performance.

The NXP/Philips TM3260 TriMedia processor is a five-issue, very long instruction word (VLIW) processor. It supports a 4-Gbyte, 32-bit address space, and has a 32-bit datapath. The processor has one hundred twenty-eight 32-bit general-purpose registers, r0, ..., r127, organized in a unified register-file structure. Register r0 always contains the integer value "0", register r1 always contains the integer value "1". The TM3260 issues one VLIW instruction every cycle. Each instruction may include as many as five operations. Each of the operations may be guarded, e.g., their execution can be made conditional based on the value of the least significant bit of the operation's guard register. Such allows the compiler/scheduler to do aggressive speculation/predication in order to exploit parallelism in the source code, and thereby gain better processor performance.

Figure 1:
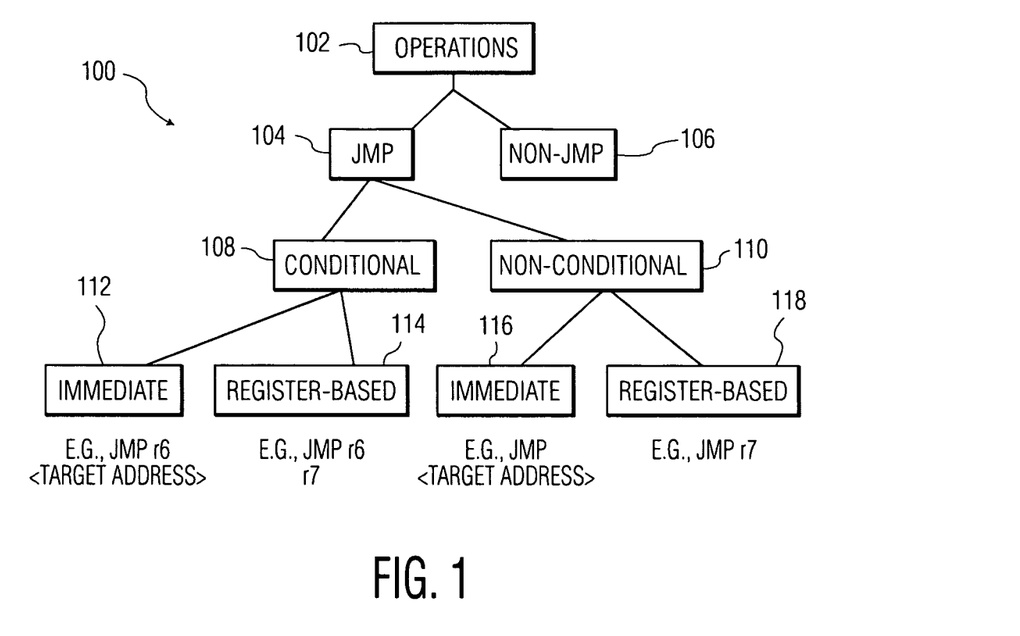
FIG. 1 is a diagram representing the organization and differences in branch delay slots that can be assigned for a pipelined processor embodiment of the present invention.
Figure 2:
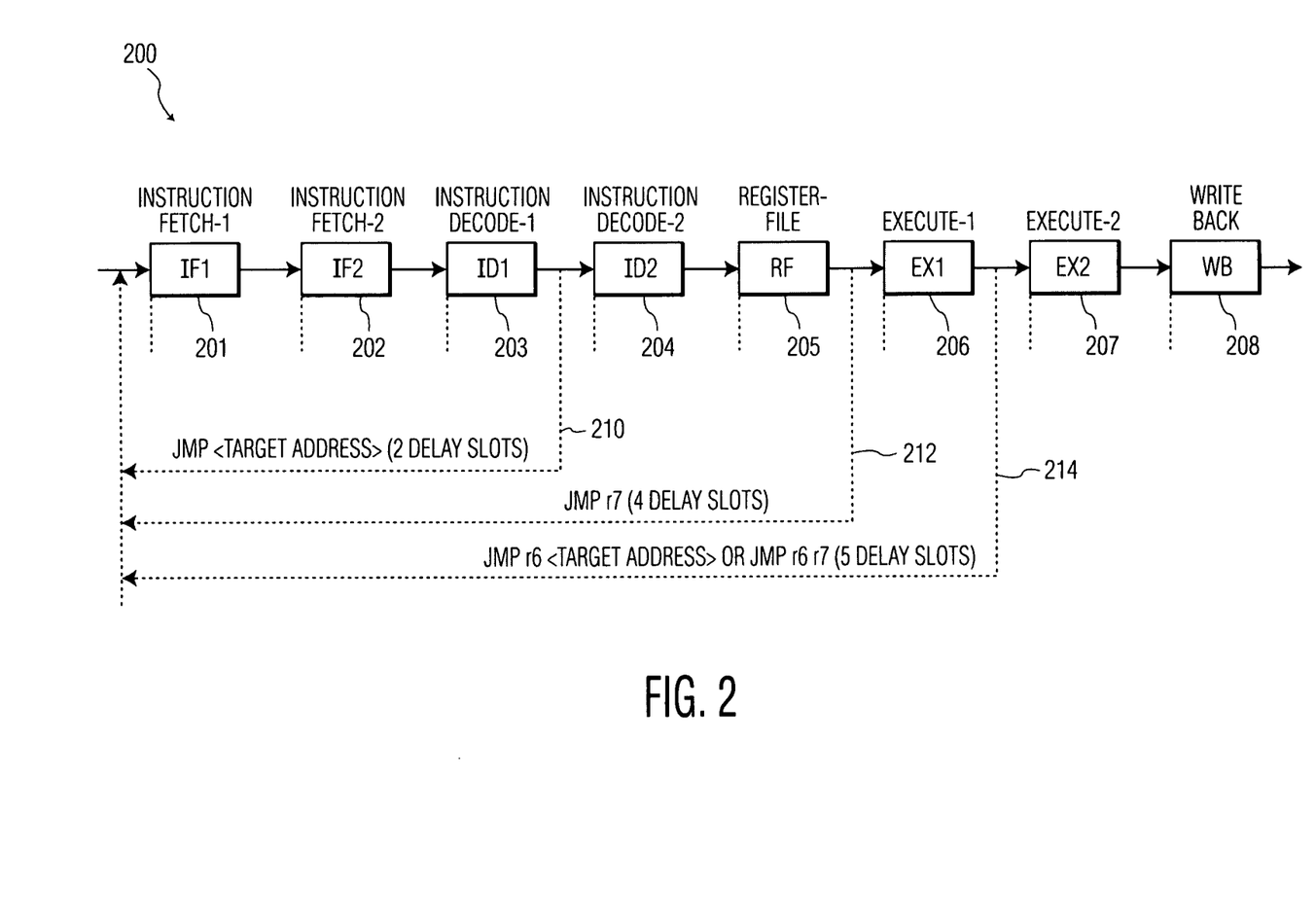
FIG. 2 is a functional block diagram an eight-stage processor pipeline in an embodiment of the present invention, and showing that some jump types can have their target addresses determined in the instruction decode stage, while others require more time and more branch delay slots for the register-file or execute stages to provide the resolved target addresses.

FIG. 1 represents a taxonomy 100 of (JMP) operations that can be executed in an 8-stage processor pipeline 200 of FIG. 2, in embodiments of the present invention. A computer memory storing a program typically provides both operations for execution and data (operands) in support of those operations. For purposes of the present invention, a series of operations 102 are divided into jumps/branches JMP 104 and non-JMP 106. Only the JMP operations will involve branch delay slots that need to be identified by a compiler/scheduler that assembles the machine program. The JMP operations 104 are further divided into conditional types 108 and non-conditional types 110. The conditional JMP's will be either immediate 112, as in JMP r6 <target address>, or register based 114, as in JMP r6 r7. The non-conditional JMP's 110 will either be immediate 116, as in JMP <target address>, or register-based 118, as in JMP r7.

Referring now to FIG. 2, the 8-stage processor pipeline 200 includes a first instruction fetch stage (IF1) 201, a second instruction fetch stage (IF2) 202, a first instruction decode stage (ID1) 203, a second instruction decode stage (ID2) 204, a register file stage (RF) 205, a first execution stage (EX1) 206, a second execution stage (EX2) 207, and a write-back stage (RB) 208. The ID1 stage 203 is the first one in the pipeline that can be used to determine if an operation is a JMP operation 104 (FIG. 1). In the ID1 stage 203, the type of JMP operation can be determined, e.g., conditional-immediate 112, conditional-register-based 114, non-conditional-immediate 116, or non-conditional-register-based 118 target address. The JMP immediate types have the target address built in as part of the operation word. But if the JMP depends on a register-based target address, that address will not be available until two stages later, in the RF-stage 205. And if the JMP is conditional, the condition will not be resolved and the target address determined until three stages later, in the EX1 stage 206.

Taking into account the availability of condition and jump target information: "conditional jump with immediate target" JMP operations can be performed in the EX1 stage, with 5 delay slots. "unconditional jump with immediate target" JMP operations can be performed in the ID1 stage, with 2 delay slots. "conditional jump with register based target" JMP operations can be performed in the EX1 stage, with 5 delay slots. "unconditional jump with register based target" JMP operations can be performed in the RF stage, with 4 delay slots.

This is a significant improvement compared to always having five delay slots, allowing the compiler/scheduler to generate more efficient code.

Figure 3:
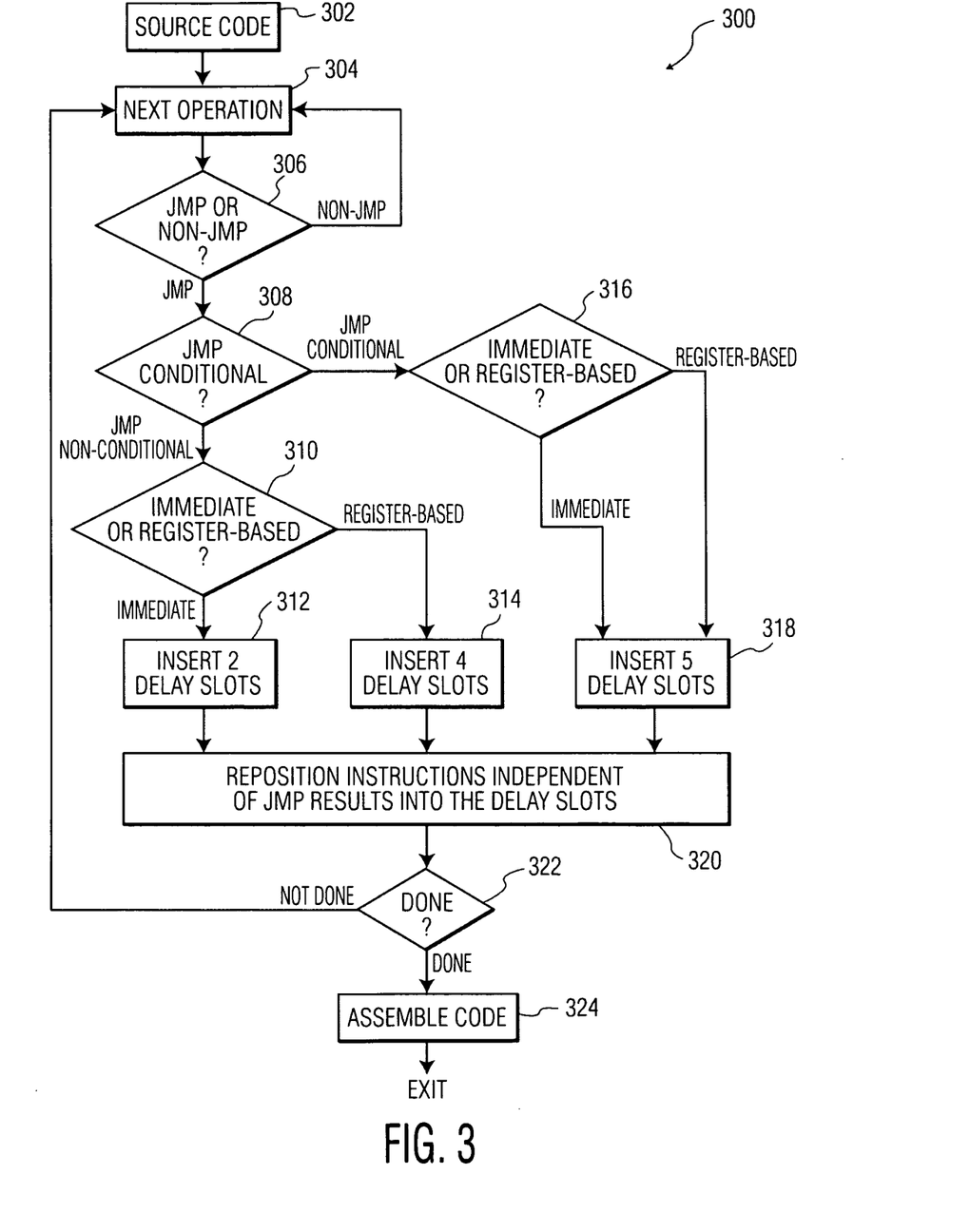
FIG. 3 is a flow chart diagram of a compiler/scheduler for detecting jumps in the source code, and for assigning a variable number of branch delay slots, as in FIG. 2, and for assembling code with these assignments built in for a pipeline processor.

FIG. 3 represents a compiler/scheduler method embodiment of the present invention, and is referred to herein by the general reference numeral 300. The compiler/scheduler inputs a source code in a step 302. A next operation for evaluation is fetched in a step 304. A step 306 decides if the operation is a JMP or non-JMP. If non-JMP, then a return for the next operation is made to step 304. Otherwise, if a JMP, the a step 308 determines if the JMP is non-conditional. If so, a step 310 inspects the operation for immediate or register-base type. If immediate, a step 312 inserts two delay slots in the assembler string that will have to be filled with pipeline relocateable instructions or with NOP's.

If the JMP was a register-based non-conditional type, then a step 314 inserts four delay slots in the assembler string. If the JMP was conditional, it will take more time to evaluate during execute time. A step 316 inspects the operation for immediate or register-based type. In this example, both types of conditional JMP's will require the insertion of five delay slots by a step 318. Other applications may make distinctions on how many delay slots to insert based on whether the JMP conditional type is immediate or register-based.

A step 320 scavenges for instructions proximate to the JMP that could be in the pipeline during, and executed after, the JMP because they are independent of the JMP. If so, the source code is reorganized accordingly. If not enough can be found, then NOP's are used to fill in the balance, e.g., to fill the 2, 4, or 5 delay slots inserted by steps 312, 314, and 318. A step 322 determines if more instructions in the source code need evaluation, and if so control returns to step 304. Otherwise, a step 324 assembles the reorganized code.

Figure 4:
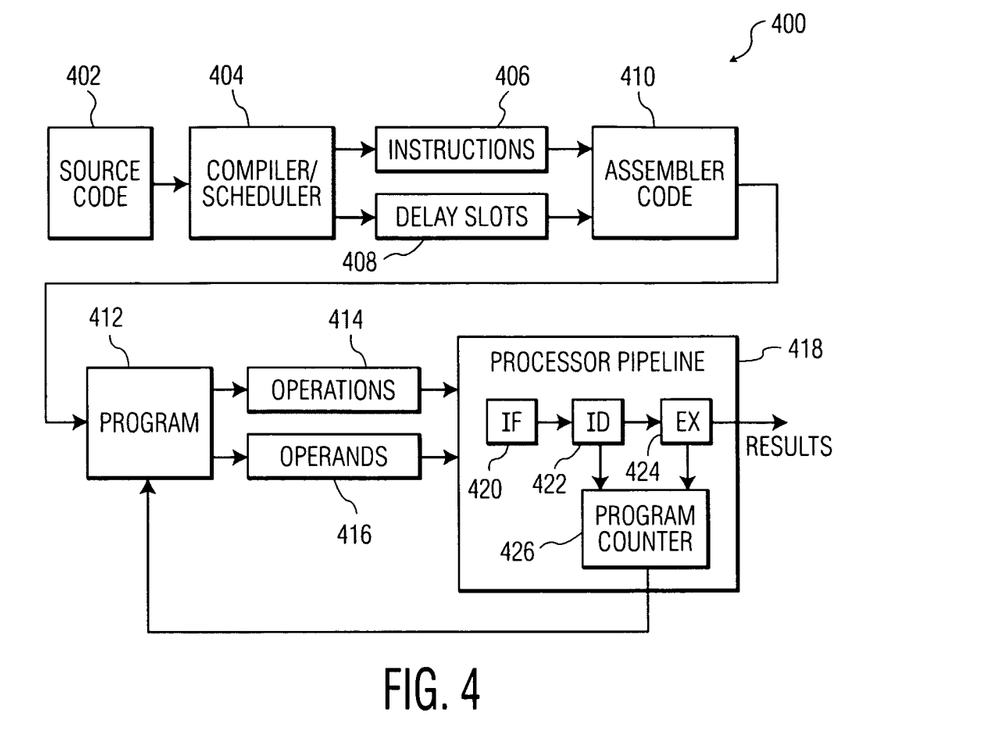
FIG. 4 is a functional block diagram a computer system with source code, compiler/scheduler, and pipelined processor in an embodiment of the present invention.

FIG. 4 shows a computer system embodiment of the present invention, and is referred to herein by the general reference numeral 400. The system 400 comprises a source code 402 written by a programmer for a particular application, e.g., video-audio processing. A compiler/scheduler 404 finds the jump/branch instructions and reorganizes the instructions 406 to use a minimum number of delay slots 408 given how early in a pipelined processor the jump addresses can be resolved. The compiler/scheduler 404 produces an assembler code 410 that is loaded into a program memory 412. Operations 414 and their operands 416, which are part of the operation word, are fetched and executed by a processor 418, e.g., a statically scheduled, pipelined very long instruction word (VLIW) type with eight issue slots. The operands can be immediates or register identifiers.

For example, a NXP/Philips VLIW TriMedia processor for audio-video processing. An instruct fetch (IF) stage 420 in a processor pipeline fetches the operations 414 and operands 416 and passes them on to an instruction decode (ID) stage 422. While the ID stage 422 is decoding the instruction, the IF stage is fetching the next one from program 412. The ID stage 422 will detect any JMP instructions and be able to classify them according to how many delay slots are needed to resolve the target address. If such target addresses cannot be resolved by the ID stage 422, they are passed on in the next cycle to be executed by execution (EX) stage 424. If the ID stage 422 was able to resolve the target address at that point in the processor pipeline, a program counter 426 is loaded and the IF stage 420 updated. Otherwise, the EX stage 424 will update the program counter 426 in a next cycle or two.

Figure 5:
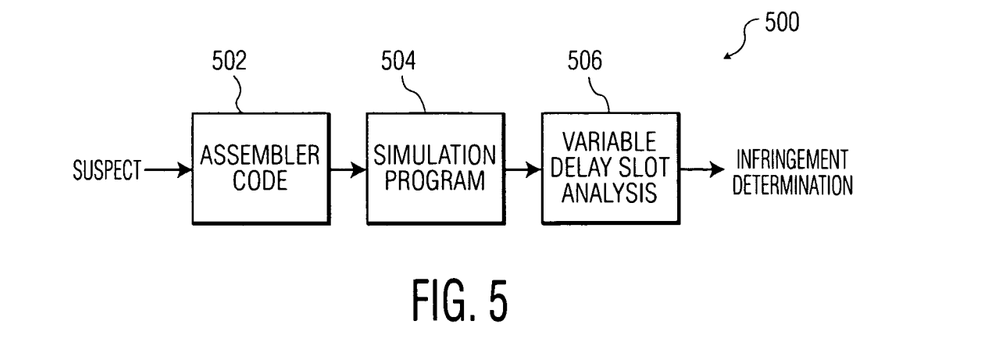
FIG. 5 is a functional block diagram of a business method embodiment of the present invention for detecting and analyzing patent infringement of the subject matters related to FIGS. 1-4.

FIG. 5 illustrates a business model embodiment of the present invention which is useful to detect patent infringement, for example, of the system 400 in FIG. 4, and is referred to herein by the general reference numeral 500. Business model 500 begins by identifying infringement suspects. A suspect assembler code 502 is run on a simulation program 504 while looking for jump/branch instructions. A variable delay slot analysis 506 is used to detect any variability in the number of delay slots following JMP instructions. Such variability is a telltale for the probable infringement of patents related to the subject matter of system 400.

While the present invention has been described with reference to several particular example embodiments, those skilled in the art will recognize that many changes may be made thereto without departing from the spirit and scope of the present invention, which is set forth in the following claims.

The invention claimed is:

1. A method, comprising:
   determining, with a compiler/scheduler, whether a branch instruction in a sequence of instructions is conditional or non-conditional, wherein the branch instruction is conditional if branching to a target address of the branch instruction is dependent upon a condition of the branch instruction being satisfied during execution;
   determining a quantity of associated branch delay slots assigned to the branch instruction, wherein the quantity varies based on whether the branch instruction is conditional or non-conditional and based on an addressing mode used to determine the target address of the branch instruction; and
   filling the determined quantity of associated branch delay slots with instructions for which correctness of execution in the sequence of instructions is not dependent on whether execution of the branch instruction results in branching to the target address.

2. The method of claim 1, wherein said determining a quantity of associated branch delay slots further comprises determining the quantity of associated branch delay slots based on whether the addressing mode uses immediate addressing.

3. The method of claim 1, wherein said filling the determined quantity of associated branch delay slots comprises:
   selecting, from instructions proximate the branch instruction, instructions equal in quantity to the determined quantity of associated branch delay slots; and
   moving the selected instructions to the determined quantity of associated branch delay slots.

4. The method of claim 1, wherein said filling the determined quantity of associated branch delay slots comprises:
   moving one or more instructions proximate the branch instruction to one or more of the determined quantity of associated branch delay slots; and
   adding a no-op instruction to any non-filled branch delay slot of the determined quantity of associated branch delay slots.

5. The method of claim 1, wherein said determining a quantity of associated branch delay slots comprises determining that the quantity of associated branch delay slots equals two branch delay slots in response to determining the branch instruction is non-conditional and the addressing mode uses immediate addressing.

6. The method of claim 1, wherein said determining a quantity of associated branch delay slots comprises determining that the quantity of associated branch delay slots equals four branch delay slots in response to determining the branch instruction is non-conditional and the addressing mode uses register-based addressing.

7. The method of claim 1, wherein said determining a quantity of associated branch delay slots comprises determining that the quantity of associated branch delay slots equals five branch delay slots in response to determining the branch instruction is conditional.

8. A non-transitory computer readable storage device comprising a plurality of instructions stored therein that, in response to being executed by a computer system, result in a computer system:
   determining, with a compiler/scheduler, whether a branch instruction of a sequence of instructions is conditional or non-conditional, wherein the branch instruction is conditional if branching to a target address of the branch instruction is dependent upon a condition of the branch instruction being satisfied during execution;
   determining a quantity of associated branch delay slots assigned to the branch instruction, wherein the quantity varies based on whether the branch instruction is conditional or non-conditional and based on an addressing mode used to determine the target address of the branch instruction; and
   filling the determined number of branch delay slots with instructions that are selected to maintain a correct result of the sequence of instructions despite execution of the selected instructions regardless of whether execution of the branch instruction results in branching to the target address.

9. The non-transitory computer readable storage device of claim 8, wherein the plurality of instructions further result in the computer system determining the quantity of associated branch delay slots based further on whether the addressing mode uses immediate addressing.

10. The non-transitory computer readable storage device of claim 8, wherein the plurality of instructions further result in the computer system:
    selecting, from instructions proximate the branch instruction, instructions equal in quantity to the determined quantity of associated branch delay slots; and
    moving the selected instructions to the determined quantity of associated branch delay slots.

11. The non-transitory computer readable storage device of claim 8, wherein the plurality of instructions further result in the computer system:
    moving one or more instructions proximate the branch instruction to one or more of the determined quantity of associated branch delay slots; and
    adding a no-op instruction to any branch delay slot of the determined quantity of associated branch delay slots that remain empty after said moving.

12. The non-transitory computer readable storage device of claim 8, wherein the plurality of instructions further result in the computer system determining that the quantity of associated branch delay slots equals two branch delay slots in response to determining the branch instruction is non-conditional and the addressing mode uses immediate addressing.

13. The non-transitory computer readable storage device of claim 8, wherein the plurality of instructions further result in the computer system determining that the quantity of associated branch delay slots equals four branch delay slots in response to determining the branch instruction is non-conditional and the addressing mode uses register-based addressing.

14. The non-transitory computer readable storage device of claim 8, wherein the plurality of instructions further result in the computer system determining that the quantity of associated branch delay slots equals five branch delay slots in response to determining the branch instruction is conditional.

15. A computer system, comprising:
a compiler/scheduler configured to:
determine whether a branch instruction in a sequence of instructions is conditional or non-conditional, wherein the branch instruction is conditional if branching to a target address of the branch instruction is dependent upon a condition of the branch instruction being satisfied during execution,
determine a quantity of associated branch delay slots corresponding to instruction slots after an instruction slot for the branch instruction, wherein processing instructions in the corresponding instruction slots begins prior to completion of the branch instruction, and wherein the quantity varies based on whether the branch instruction is conditional or non-conditional and based on an addressing mode used to determine the target address of the branch instruction, and
fill the determined quantity of associated branch delay slots with instructions that are permitted to execute to completion regardless of whether execution of the branch instruction results in branching to the target address; and
a processor pipeline configured to execute the sequence of instructions including the filled branch delay slots.

16. The computer system of claim 15, wherein the scheduler is further configured to determine the quantity of associated branch delay slots based further on whether the addressing mode uses immediate addressing.

17. The computer system of claim 15, wherein the scheduler is further configured to select, from instructions proximate the branch instruction, instructions equal in quantity to the determined quantity of associated branch delay slots, and move the selected instructions to the determined quantity of associated branch delay slots.

18. The computer system of claim 15, wherein the scheduler is further configured to move one or more instructions proximate the branch instruction to one or more of the determined quantity of associated branch delay slots, and add a no-op instruction to any branch delay slots of the determined quantity of associated branch delay slots that remain empty after said move.

19. The computer system of claim 15, wherein the scheduler is further configured to determine that the quantity of associated branch delay slots equals two branch delay slots in response to determining the branch instruction is an unconditional jump instruction that uses immediate addressing.

20. The computer system of claim 15, wherein the scheduler is further configured to determine that the quantity of associated branch delay slots equals four branch delay slots in response to determining the branch instruction is an unconditional jump instruction that uses register-based addressing.

21. The computer system of claim 15, wherein the scheduler is further configured to determine that the quantity of associated branch delay slots equals five branch delay slots in response to determining the branch instruction is a conditional jump instruction.

* * * * *